United States Patent [19]

Williams

[11] 4,253,424
[45] Mar. 3, 1981

[54] INVERTIBLE FEED BUNK

[75] Inventor: Galen Williams, Pittsburg, Kans.

[73] Assignee: Harvest Industries, Inc., Wilmette, Ill.

[21] Appl. No.: 63,364

[22] Filed: Aug. 3, 1979

[51] Int. Cl.³ ............................................. A01K 5/01
[52] U.S. Cl. ................................................. 119/61
[58] Field of Search .................. 119/61, 58, 60, 17, 119/62, 63, 51 R; 206/515, 519; 220/69, 1 B

[56] References Cited

U.S. PATENT DOCUMENTS

| | | | |
|---|---|---|---|
| 1,198,238 | 9/1916 | Klein et al. | 119/61 |
| 3,683,857 | 8/1972 | Yellin | 119/17 |

*Primary Examiner*—Hugh R. Chamblee

*Attorney, Agent, or Firm*—Rogers, Eilers & Howell

[57] ABSTRACT

An animal feed bunk has a base of arcuate cross section which in the upright feeding position supports above it a trough of arcuate cross section. The base can be detached from the trough, and inverted relative to the trough and reattached to the trough so that the bunk in the inverted position occupies much less space than in the upright position, and has its parts firmly secured to one another to prevent them from being misplaced or lost. In the inverted position, a plurality of bunks may be stacked sturdily upon one another, so that a bottom bunk in the stack has a substantial part of its base and trough fitted snugly within the trough of the bunk above it.

12 Claims, 8 Drawing Figures

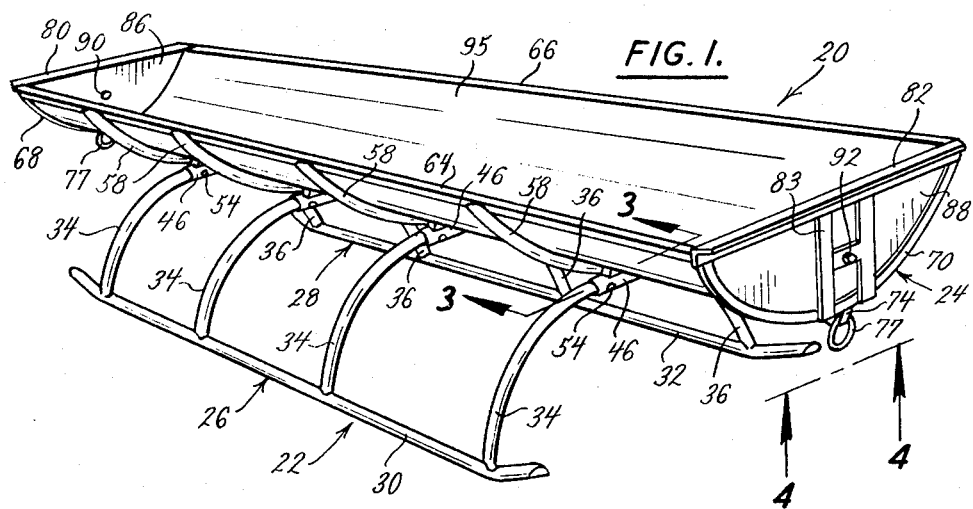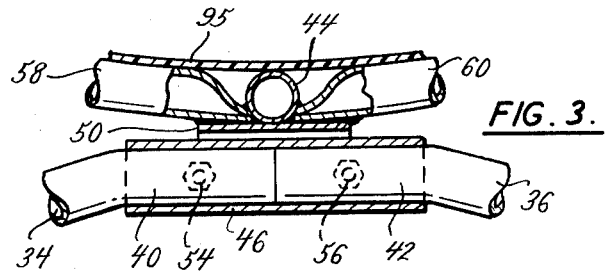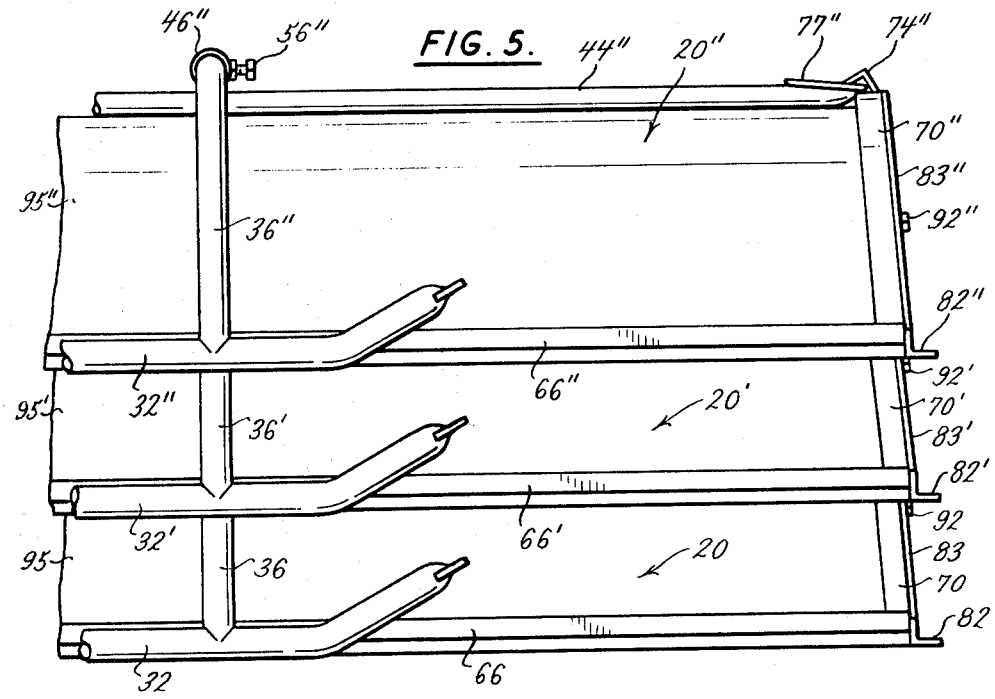

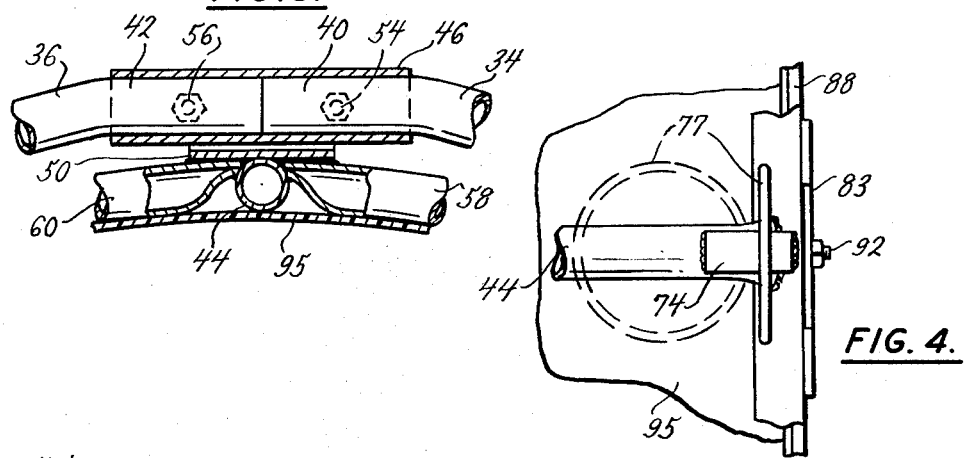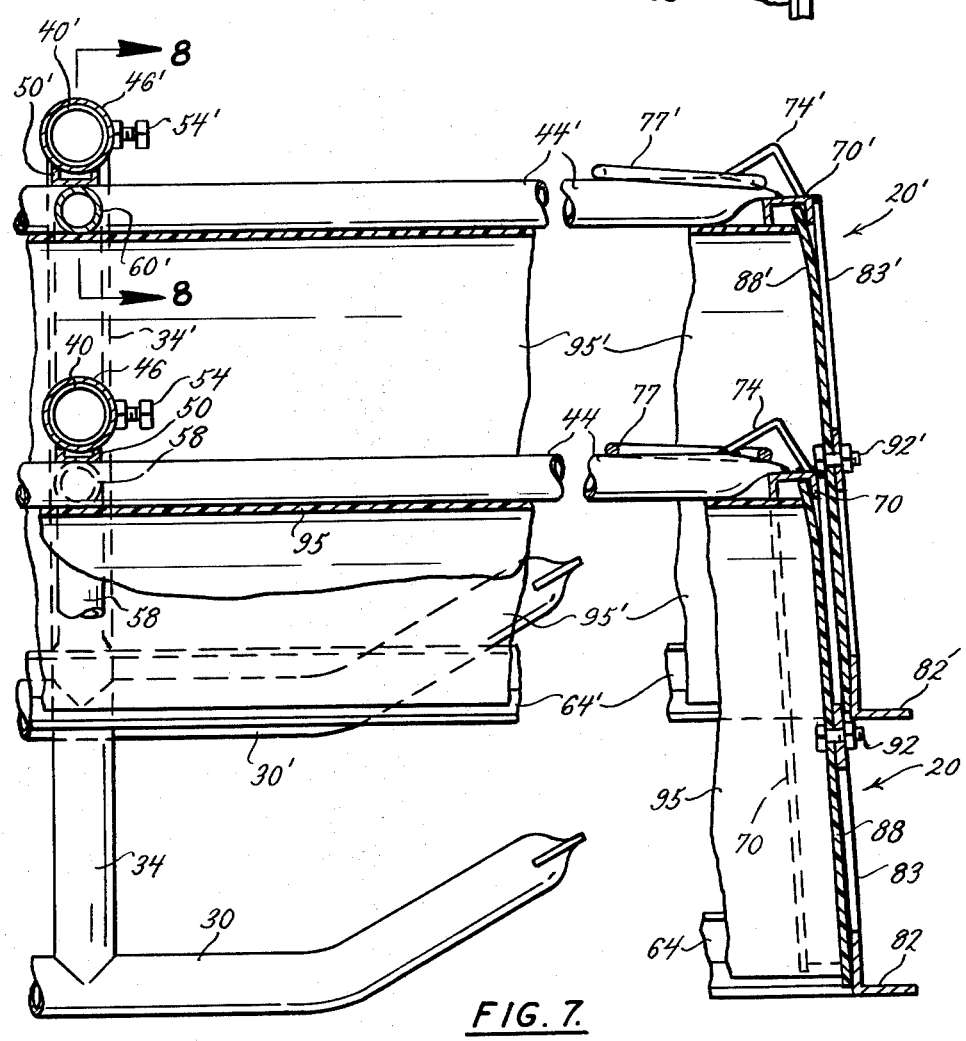

INVERTIBLE FEED BUNK

BACKGROUND, FIELD AND SUMMARY OF THE INVENTION

The present invention is concerned with animal feeding bunks and more specifically with animal feed bunks placed on the ground for the feeding of animals. In the prior art, feed bunks having a trough supported by a base are used for the feeding of animals. Prior art bunks do not provide the advantages of the present invention in compactness of disassembly for storage and shipping purposes. Some prior art devices have legs firmly attached to the trough which legs can be bent along the trough sides of the trough. However, this is undesirable as material fatigue resulting from bending can weaken the legs to cause them to break and fail so that the bunks cannot be used and must have the broken parts required or replaced. Such feed bunks do not have the shape to allow the fitting of one disassembled bunk into another as provided by the present invention.

Other feed bunks have a trough with a base which can be detected from the trough. However, the base is not shaped so that it can be inverted relative to the trough and reattached to the trough so that the trough fits within the base, or to provide the fitting of one bunk within another. Other prior art bunks have legs which are pivotally connected to the trough and which may be pivoted above the trough for suspending the trough, but such pivoting does not reduce space for shipping or storage, nor are such bunks shaped so as to receive each other for compactness in shipping or storage.

The present invention improves over the prior art. The invention comprises a bunk having a trough supported by a base. The base, in the upright position, has a generally concave underside and a generally convex upper side. The base is centrally divided into two side sections, each having arcuate legs which at their lower ends extend into sled type runners. The legs have a straight section at their upper ends which fit within sleeves secured to the bottom of a trough to be firmly held therein, so that the trough is supported above the base in the upright position for feeding.

The trough, in the upright position, has a concave upper side and a convex lower side. The trough has sloped ends so that the bottom length of the trough is shorter than its top length. The base can be detached from the trough, and its position relative to the trough inverted, to allow each base section to be reattached within the trough sleeves so that the base concave side fits around the convex side of the trough for a compact shipping or a storage assembly. In the inverted position, the shipping or storage space required for the bunk is greatly reduced, and the base in its inverted position remains firmly attached to the trough so that parts of the feed bunk are not lost or damaged.

The novel bunk thus provides a compact storage or shipping arrangement for a unitary bunk, but the invention further comprises other beneficial features. The symmetrical nature of the inverted bunk and the other features of the shape allow one inverted bunk to be stacked upon another inverted bunk with the concave trough side of an upper bunk receiving within it a substantial portion of the convex side of the inverted base and trough of the lower bunk. In this fashion, several inverted bunks can be stacked upon each other with each bunk trough receiving a substantial part of the base and trough of the bunk beneath it. The symmetry of the bunks allows the stack to be balanced to avoid toppling of the stack, and the parts of the inverted bunks are positioned so that components of the bunks are not punctured by other components. Thus many such bunks may be stored in a prescribed area.

It is an object of the present invention to provide for a bunk that in its operative feeding position has its trough elevated, and can be conveniently disassembled from its operative position and reassembled into a compact arrangement.

It is an object of the invention to provide a bunk that has a base that fits with a trough for a compact arrangement.

It is an object of the present invention to provide a bunk that can be assembled for shipping or storage so that parts of the bunk are not separated from one another.

It is an object of the present invention to provide a bunk that can be assembled for shipping or storage without bending or misshaping parts of the bunk.

It is an object of the invention to provide a bunk which in plurality can be stacked together in a compact and stable arrangement which does not damage the bunks.

DESCRIPTION OF THE DRAWINGS

FIG. 1 is a perspective view of the feed bunk in the upright feeding position, with the trough mounted upon the base;

FIG. 3 is a section taken on the line 3—3 of FIG. 1 of the bottom middle portion of the trough and the top middle portion of the base showing a pair of the base legs inserted within one of four sleeves attached to the bottom of the trough;

FIG. 4 is a view of part of the bottom end of the trough taken on the line 4—4 of FIG. 1, showing in dashed lines the tow ring when the trough is turned upside down with the side of the end not shown;

FIG. 5 is a side view of three inverted bunks stacked upon one another, with the left end of the bunks broken away;

FIG. 7 is a section taken on the line 7—7 of FIG. 6, some parts being shown broken, of inverted stacked bunks with the top bunk of FIG. 6 not shown at all for purposes for clarity; and FIG. 8 is a section of the bunk in the inverted position, showing the same members of the bunk as FIG. 3, but with the trough turned upside down, and with the base inverted relative to the trough.

DESCRIPTION OF PREFERRED EMBODIMENT

In General

Figure 6:
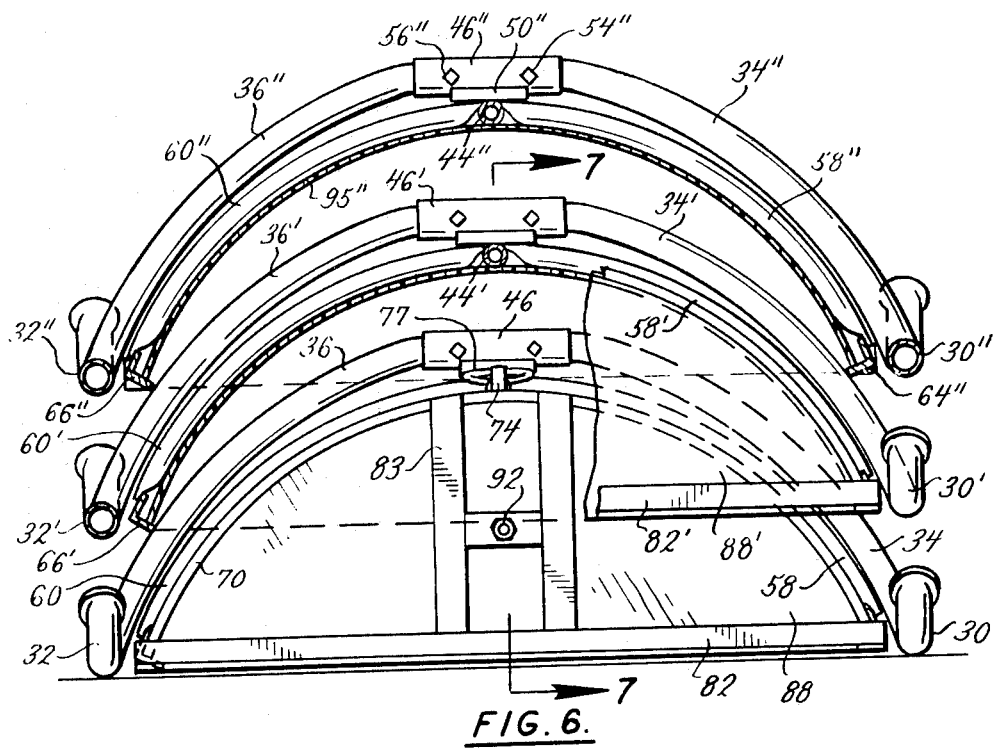
FIG. 6 is an end plan view, with some parts being shown broken, of three inverted bunks in the stacked position.
Figure 2:
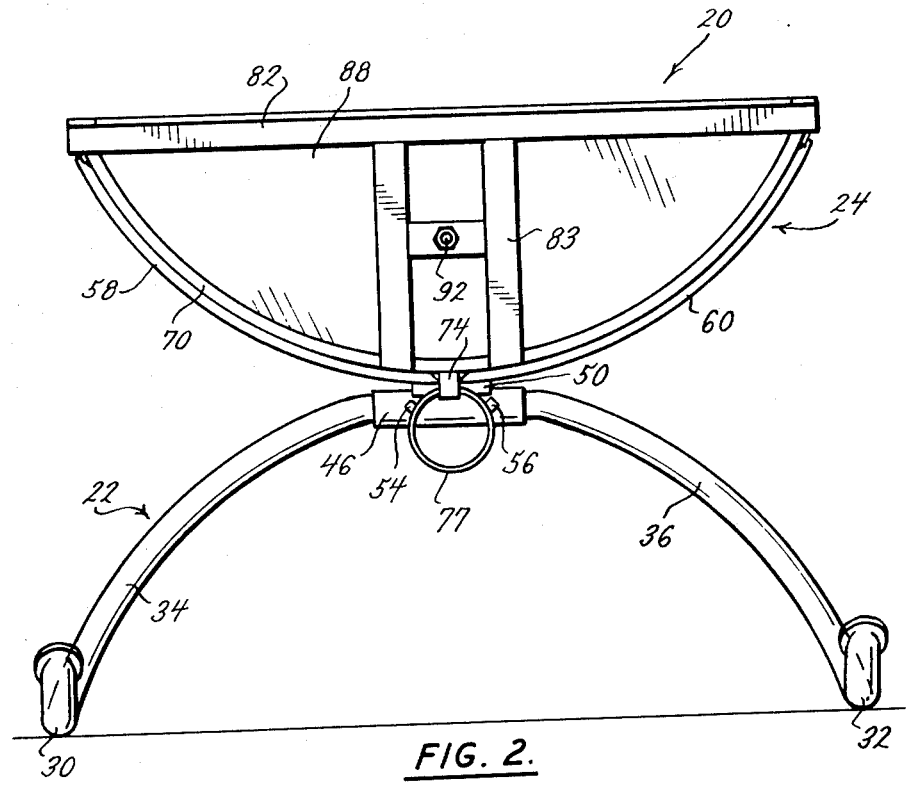
FIG. 2 is an end plan view of the right end of the bunk of FIG. 1.

By way of overall introduction, FIGS. 1–4 show the feed bunk 20 in its upright operational position for feeding cattle. With reference to this upright position, the bunk has a lower longitudinal base 22 having a curved bottom side of generally concave shape facing downward, and a generally convex upper side. Above base 22 is mounted a trough 24 having an upper side of generally concave shape curving upwardly in a direction opposite that of the base concavity, and an underside of generally convex shape.

The base 22 has two indentical detachable side sections 26 and 28, comprising sled type runners 30 and 32 respectively, each runner having four equidistantly spaced curved legs 34 and 36 having lower ends welded to the runners.

FIGS. 5–8 show a plurality of bunks 20 in the inverted stacked storage, or shipping position, in which each trough is rotated 180° from the FIG. 1 position so that the trough concavity opens downwardly. In this storage position, the base side sections 26 and 28 have been removed from their FIGS. 1–3 attachments and reattached to the trough so that their position relative to the trough has been reversed with the base concavity curving around the convex side of the trough for a compact assembly.

The bunk will now be described first in the upright position of FIGS. 1–4, with some references being made to the stacked position of FIGS. 5–8. The width of the bunk both in the upright and inverted positions is along the horizontal of FIGS. 2 and 6 while the depth is along the vertical of FIGS. 2 and 6. The bunk length is along the horizontal of FIG. 5.

Specifically

With reference to the upright position of FIGS. 1–4, the runners 30 and 32 have upwardly slanting closed ends for convenient sliding. The legs 34 and 36 have notched lower ends that are welded to the outer surfaces of the runners. The legs are curved in a circular arc, and extend upwardly into straight thigh ends 40 and 42 each of which fit within a cylindrical hip joint sleeve to be described. The base concavity is formed between the base side sections.

The trough 24 comprises a straight cylindrical spine tube 44 extending lengthwise along the middle underside of the trough. Four parallel cylindrical hip joint sleeves 46 are equidistantly spaced on the underside of spine 44 perpendicular to the spine so that each sleeve is aligned with a corresponding pair of legs 34 and 36 and telescopically receives the thighs 40 of those legs. Referring to FIG. 3, each hip sleeve 46 has its upper surface welded to the bottom open end of a channel 50, with the top closed end of the channel welded to the bottom of spine 44. Each hip sleeve 46 has spaced on either side of the spine a pair of horizontally threaded projections which receive threaded bolts 54 and 56 that are screwed to press against the leg thighs 40 and 42 to hold them firmly within the sleeves and thus hold the legs 34 and 36 securely to the trough and in fixed relationship to each other.

On each side of trough 24 are four parallel equidistantly spaced rib tubes 58 and 60 of identical shape, which are curved in a circular arc. Referring to FIG. 3, the bottom of each of the ribs 58 and 60 are crimped closed and welded to the lower side of the spine 44 and to the upper side of their corresponding channels 50. The upper ends of rib tubes 58 and 60 are also crimped and are welded to the outside of the lower flanges of angle irons 64 and 66, respectively, which are of greater length than spine 44 and extend parallel to the spine along the upper sides of the trough 24.

The ends of the spine 44 are crimped closed and welded to the bottom side of channels 68 and 70 located at the ends of the trough. The channels 68 and 70 are of a circular arc and slant outwardly from the ends of the spine with their upper ends welded to the inside of the bottom flange of the angles 64 and 66.

At the bottom of each trough end, a V-shaped plate 74 has one of its upper ends welded to the bottom of the end channels 68 and 70 respectively, and its other end welded to the bottom of spine 44 to allow a tow ring 77 to be secured to the trough.

At the upper ends of trough 24 are straight horizontal angle irons 80 and 82, each having their vertical flanges welded to the ends of the trough side angles 64 and 66 as well as to the upper exterior sides of the end channels 68 and 70.

At each trough end is a middle H-shaped support 83, one such support being shown in the drawings. The H-support 83 comprises a horizontal cross bar having its ends welded to two vertical legs. The upper ends of the vertical legs of the H, are welded to the lower edge of the vertical flange of end angles 80 and 82, and the bottoms of the vertical H legs are welded to the exterior side of end channels 68 and 70. If desired, a single I shaped middle vertical support bar can be used in place of the H 83.

The spine 44, ribs 58 and 60, side angles 64 and 66, end channels 68 and 70, end angles 80 and 82, and H supports 83 form a frame to support a basin for the trough. The basin is formed by a pair of flat semi-circular end plates 86 and 88 at each trough end, having their lower curved edges fitting within the walls of channels 68 and 70 respectively, and their upper straight ends fitting against the interior sides of the vertical flanges of end angles 80 and 82 respectively. Bolts 90 and 92 extend through aligned bores in the basin ends 86 and 88 and in the horizontal cross bars of the H support 83, and are secured by nuts to hold the basin ends in fixed relationship to the trough frame. The basin ends, being mounted within the walls of the tilted end channels, are also tilted outwardly so that the trough ends slant outwardly from bottom to top. The slanted basin ends 86 and 88 and the slanged end channels 68 and 70 cause the length of the bottom of the trough to be shorter than the length of the top of the trough. The slanted nature of the ends permit one inverted bunk to be inserted lengthwise within the trough of another inverted bunk, as will be later described.

The basin further includes a flexible plastic sheet 95. The sheet 95 before being installed in the trough frame is initially flat so that when the sheet is bent the natural pressure exerted by the curved sheet forces its longitudinal edges outwardly to retain them beneaththe top flanges and within the bottom flanges of angles 64 and 66. The sheet ends are formed so that when the sheet is bent as shown the ends are in a semi-circular shape conforming with that of the semi-circular basin ends 86 and 88, so that the sheets ends abut the interior sides of the tilted basin ends 86 and 88. If desired the ends of sheet 95 and the semi-circular edges of basin ends 86 and 88 can be secured together by an adhesive, although by allowing these parts to remain separate the basin may be easily removed from the trough frame.

At this point, we refer to details of FIGS. 5–8, showing the inverted bunks. The bottom bunk has its parts numbered in accordance with the bunk of FIGS. 1–4, while the bunk immediately above it is indicated by single primes, and the third bunk on the top of the stack of FIGS. 5 and 6, by double primes. FIG. 7 shows the receipt of the semi-circular edges of basin ends 88 and 88' within the walls of the end channels 70 and 70'; and also attachment of an end of the spines 44 and 44' to the channels 70 and 70'. FIG. 7 further shows the abutment of the ends of curved basin sheets 95 and 95' against the insides of tilted basin ends 88 and 88', and the abutment of the vertical flange of trough end angle 82 and 82' against the outside of basin ends 88 and 88'.

The base sections are preferably formed of steel tubing. The various members of the trough are preferably formed of steel, except for the basin which is preferably of plastic although it could be made of metal if desired.

Operation

For purposes of illustration the operation of the bunk and its stacking will begin with the bunk in the upright position of FIGS. 1–4. In the upright position, the base runners 30 and 32 rest upon the ground, and the bolts 54 and 56 are screwed tightly against the thighs 40 and 42 of legs 34 and 36 to hold the base side sections 26 and 28 firmly to the trough and thus elevate the trough 24 above the ground. Animal feed can be placed within the trough basin so that animals, such as cattle, can eat the feed.

The bunk is placed in the storage or shipping position by first rotating the bunk from its FIG. 1 position 180° about an axis parallel to spine 44 so that the trough side angles 64 and 66 and end angles 80 and 82 rest upon the ground to stabilize the bunk against movement. With the bunk upside down from its FIG. 1 position, the base 22 is then inverted relative to the trough 24 by removing and reattaching each of the base side sections 26 and 28. For purposes of illustration, base section 26 is handled first. First the four bolts 54 are unscrewed from each of the sleeves 46 to loosen the bolts' pressure against the thighs 40 of the legs 34. After all the bolts 54 are loosened, the leg section 26 can be grasped, such as by grasping the two middle legs 34, and pulled away from the sleeves 46 so that each of the thighs 40 slide out of the sleeves. After the thighs 40 are removed from sleeves 46, the base section 26 is lifted above the ground a sufficient distance for rotation clearance, and then is rotated 180° about an axis equidistant between the two inner sleeves 46 and parallel to sleeves 46. After rotation, base section 26 is moves so that each of the thighs 40 can then be aligned with a sleeve 46 and inserted therein until the ends of each thigh 40 abut each of the ends of the other thighs 42. The bolts 54 are then screwed tightly upon the thighs 40 to hold them and base side section 26 in the position shown in FIGS. 6–8 so that the legs 34 curve around the convex side of trough 24.

The other base section 28 is inverted relative to the trough in similar fashion. The four bolts 56 are loosened to reduce their pressure against the thighs 42 so that the thighs 42 slide out of sleeves 46 by pulling on the middle two legs 36 of base section 28. After the thighs 42 are removed from the sleeves 46, the base section 28 is lifted and rotated 180° about the same axis of rotation as for base section 26, and then lowered so that the thighs 42 are aligned with sleeves 46 and inserted within the sleeves until the ends of the thighs 42 abut the ends of the thighs 40. The bolts 56 are then screwed to press upon the thighs 42 to hold them within the sleeves 46. Both base side sections 26 and 28 are then in the position of FIGS. 5–8 so that the legs 34 and 36 curve around the convex side of the trough but touch neither the sheet 95 nor the ribs 58 and 60.

When two or more bunks are desired to be stacked, each of the bunks is inverted as described above so that the base curves around the trough. Stacking is performed by laying a first inverted bunk 20 with the top of its trough 24 on the ground as aforesaid, and then lifting a second inverted bunk 20' directly above the bunk 20 and lowering it so that part of the inverted base 22 and the inverted trough 24 fit within the basin concavity of the second trough 24', as shown in FIGS. 5–7. In this stacked position the side angle irons 64' and 66' of trough 24' rest upon the curved exterior of the legs 34 and 36 of the bunk 20, and the exterior sides of the H supports 83 of the bottom trough 24 fit flush against the inside of the basin ends of trough 24' as shown for basin end 88' in FIG. 7. The tilted end channels 68 and 70 of the bottom trough 24 fit within the trough 24' to about the depth of the end bolts 90' and 92', as shown for the channel 70 and the bolt 92' in FIG. 7.

After the two bunks 20 and 20' are stacked, a third bunk 20" can be stacked upon the bunk 20' in the same fashion as described for stacking the bunk 20' upon bunk 20', and lowered so that part of the inverted base 22' and the inverted trough 24' fit within the basin concavity of the third trough 24" of the bunk 20" as shown in FIGS. 5 and 6, with the end of trough 24' fitting within trough 24" in the same fashion described for troughs 24 and 24'. Other like bunks can be stacked upon bunk 20" if desired.

As shown clearly in FIG. 6, the exterior cross sectional width and depth of the trough is less than the interior width and depth of the base cavity formed by the inner surfaces of legs 34 and 36, and the surface of runners 30 and 32. This allows the trough to fit wholly within the base cavity when the bunk is in the inverted position.

The three troughs are symmetrically stacked so that the trough end angles 80 and 82, 80' and 82', and 80" and 82" are parallel to one another to balance the stack. The slanted ends of the runners 30 and 32 in the stacked position are in such positions that they cannot puncture an adjacent trough. The bunks 20 and 20' are thus firmly fitted in the stacked position so that they will not slide off of one another easily even when bumped inadvertently. This firm fitting allows stacks to be moved as units, such as by stacking upon a pallet so that the pallet can be carried to move the entire stack.

To put the stacked bunks in use, the top bunk 20" is removed from the stack and placed with the top of the trough on the ground, and bunk 20' can then be lifted off of bunk 20. To put the bunks in the upright position, using bunk 20 as an example, the bolts 54 of each sleeve 40 are unscrewed to allow the leg section 26 to be pulled away from the sleeves by grasping the two middle legs 34 of leg section 26. Upon removal of the thighs 40 from the sleeves 46, the leg section 26 is rotated 180° about the same axis previously described and the thighs 40 inserted within the sleeves 46 as shown in FIG. 3. The leg section 28 is detached from the inverted position by unscrewing the four bolts 56 and pulling the middle legs 36 to remove the thighs 42 from the sleeves 46. The leg section 28 is then rotated 180° about the axis previously described, and the thighs inserted within the sleeves 46, and the bolts 56 tightened to hold the legs 36 in the FIG. 3 position. The entire bunk 20 is then rotated 180° about an axis parallel to spine 44 so that the runners 30 and 32 are then placed upon the ground and the bunk is in the FIG. 1 position.

The bunk can thus be disassembled from the FIG. 1 feeding position and reassembled for shipping or storage, with great reduction of space, but yet with the members of the bunk remaining securely attached together, and in such manner that the bunks can be stacked in a sturdy compact fashion. And such stacking and transportation can be done without fear of losing parts of bunks during storage or shipping handling. The steps for disassembly from the upright position of FIG. 1 to the inverted position of FIGS. 5-7, and vice-versa, are simple and convenient, yet the bunk operates to provide an ample volume of feed in the trough, and the trough is elevated above the ground so that cattle or other animals will not be stepping into, walking or standing in the trough. The symmetry of the inverted bunks and the curved nature of the legs 34 and 36 spaces the stacked bunks from each other to prevent puncturing of the bunks.

The preferred embodiment has been shown as having a base divided into two sections. However, the base can be unitary so that the legs 34 and 36 are firmly connected to one another, with the trough having means for latching to the base when the bunk is in the upright position and when the trough is inverted relative to the base, such as four pairs of plates that fit around the base legs to be secured thereto as by bolts. The base and trough are preferably in the semi-circular shape described although the trough and base can have other shapes that conform with each other so that one may be inverted relative to the other and fit compactly within it. Although the base has been shown preferably as being inverted relative to the trough to fit around the outside of the trough, the base and trough can be constructed so that the inverted base would fit within the concavity of the trough.

The base has been shown with four pairs of legs, although a fewer or greater number of legs can be provided as desired. The spacer channels 50 have been shown positioned between the sleeves 46 and the ribs 58 and 60, and spine 44, however, if desired sleeves can be directly attached to the ribs and spine without the intermediate channel.

Various changes and modifications may be made in this invention, as will be readily apparent to those skilled in the art. Such changes and modifications are within the scope and teachings of this invention as defined by the claims appended hereto.

What is claimed is:

1. A bunk for feeding animals feed above the ground when the bunk is in an upright position, comprising:
   (a) a rigid base supported upon the ground when the bunk is in the upright position; and
   (b) a rigid trough having means for being detachably supported upon the base when the bunk is in the upright position, the base and trough being shaped to have means for conforming to the shape of one another so that from the upright position the trough can be detached from the base and inverted relative to the base, and the base and trough fitted together so that one fits substantially within the other and the base reconnected to the said means on said trough.

2. The structure of claim 1, wherein the base and trough are shaped to have means for allowing the bunk in the inverted position to be fitted with a like second inverted bunk having a like second base and like second trough so that the first bunk fits within the second bunk.

3. The structure of claim 2 wherein the first bunk fits within the second trough and within the second base.

4. The structure of claim 2 wherein in the inverted position the trough fits within the base.

5. The structure of claim 1 or 2 further comprising means to attach the trough to the base in the inverted position.

6. The structure of claim 1 or 2 wherein the base is of a generally arcuate shape and the trough is of a generally arcuate shape.

7. A bunk for feeding animals feed above the ground when the bunk is in an upright position comprising:
   (a) a rigid base supported upon the ground when the bunk is in the upright position, the base having a generally arcuate cross section with a general arcuate cavity formed by the interior width and depth of the base;
   (b) a rigid trough;
   (c) means for detachably supporting the trough upon the base in the upright position, and for attaching the base to the trough when the base is inverted relative to the trough; and
   (d) the trough having a open feed cavity of a generally arcuate cross section, and the trough having an exterior cross sectional width and depth less than the base interior cross sectional width and depth so that the trough can be detached from the base when the bunk is in the upright position and inverted relative to the base and fit wholly within the base cavity.

8. The structure of claim 7 wherein the depth and width of the trough and base are sized so that the bunk in the inverted position can be fitted with a like second inverted bunk having a like second base and a like second trough so that the base and trough of the first bunk fit substantially within the cavity of the second trough.

9. A bunk for feeding animals feed above the ground when the bunk is in an upright position, comprising:
   (a) a rigid base supported upon the ground when the bunk is in the upright position; and
   (b) a rigid trough having means for being detachably supported upon the base when the bunk is in the upright position, the base and trough being shaped to have means for conforming to the shape of one another so that from the upright position the trough can be detached from the base and inverted relative to the base, and the base and trough fitted together so that in the inverted position the trough fits substantially within the base and the base reconnected to the said means on said trough.

10. A bunk for feeding animals feed above the ground when the bunk is in an upright position, comprising:
    (a) a rigid base supported upon the ground when the bunk is in the upright position;
    (b) a rigid trough having means for being detachably supported upon the base when the bunk is in the upright position, the base and trough being shaped to have means for conforming to the shape of one another so that from the upright position the trough can be detached from the base and inverted relative to the base, and the base and trough fitted together so that one fits substantially within the other and the base reconnected to the said means on said trough; and
    (c) wherein the base and trough are shaped to have means for allowing the bunk in the inverted position to be fitted with a like second inverted bunk having a like second base and like second trough so that the first bunk fits within the second trough and within the second base.

11. A bunk for feeding animals feed above the ground when the bunk is in an upright position, comprising:
    (a) a rigid base supported upon the ground when the bunk is in the upright position, said base comprising at least two separable leg sections;

(b) a rigid trough having means for being detachably engaged to each of the base sections to be supported upon the base sections when the bunk is in the upright position, the base and trough being shaped to have means for conforming to the shape of one another so that from the upright position the trough can be detached from the base sections and inverted relative to the base sections, and the base sections attached to the trough in the inverted position at the same position of engagement of the trough to the base sections in the upright position, so that one fits substantially within the other.

12. The structure of claim 11 wherein the means for detachably engaging the trough to each of the base sections comprises the trough having receptive cavities, the base sections having upper extensions which are received within corresponding cavities and held therein when the bunk is in the upright position to support the trough in the upright position, the said base section extensions being received within the same corresponding cavities when the base sections are attached to the trough in the inverted position.

* * * * *